United States Patent [19]

Douglis et al.

[11] Patent Number: 5,493,670
[45] Date of Patent: Feb. 20, 1996

[54] ADAPTIVE DISK SPN-DOWN METHOD FOR MANAGING THE POWER DISTRIBUTED TO A DISK DRIVE IN A LAPTOP COMPUTER

[75] Inventors: Frederick Douglis, Somerset, N.J.; Brian D. Marsh, New York, N.Y.; Brian Bershad, Seattle, Wash.; Parameshwaran Krishnan, Durham, N.C.

[73] Assignee: Panasonic Technologies, Inc., Princeton, N.J.

[21] Appl. No.: 348,546

[22] Filed: Dec. 1, 1994

Related U.S. Application Data

[63] Continuation-in-part of Ser. No. 260,104, Jun. 15, 1994.

[51] Int. Cl.$^6$ .............................. G11B 21/02; G06F 1/32
[52] U.S. Cl. .................. 395/750; 364/707; 364/236.2; 364/248.1; 364/273.2; 364/DIG. 1; 360/69
[58] Field of Search .................... 395/750, 550, 395/427; 364/707; 307/66; 377/16; 360/73.03, 69, 75, 77.02, 78.13

[56] References Cited

U.S. PATENT DOCUMENTS

| | | | |
|---|---|---|---|
| 4,458,273 | 7/1984 | Johnson | 360/74.1 |
| 4,691,255 | 9/1987 | Sakai et al. | 360/69 |
| 4,717,968 | 1/1988 | Painton et al. | 358/310 |
| 4,736,263 | 4/1988 | Takahashi et al. | 360/73.03 |
| 4,783,706 | 11/1988 | Shoji et al. | 360/78 |
| 4,814,905 | 3/1989 | Hashimoto | 360/74.1 |
| 4,819,153 | 4/1989 | Graham et al. | 360/70 |
| 4,907,183 | 3/1990 | Tanaka | 364/707 |
| 4,980,836 | 12/1990 | Carter et al. | 364/483 |
| 4,984,103 | 1/1991 | Nigam | 360/66 |
| 5,087,994 | 2/1992 | Fukushima | 360/73.03 |
| 5,101,311 | 3/1992 | Richmond | 360/69 |
| 5,157,560 | 10/1992 | Kanda et al. | 360/69 |
| 5,167,024 | 11/1992 | Smith et al. | 395/375 |
| 5,197,055 | 3/1993 | Hartung et al. | 369/34 |
| 5,201,059 | 4/1993 | Nguyen | 395/800 |
| 5,214,543 | 5/1993 | Takao | 360/71 |
| 5,245,595 | 9/1993 | Yasukawa | 369/32 |
| 5,246,479 | 9/1993 | Garni et al. | 360/73.03 |

(List continued on next page.)

OTHER PUBLICATIONS

Li, Kester et al., "A Quantitive Analysis of Disk Drive Power Management in Portable Computers," Computer Science Division, University of California, Berkeley, Calif. 94720.
Douglis, Fred et al., "Thwarting the Power–Hungry Disk," 1994 *Winter USENIX Confrence*, pp. 1–15 (Dec. 2, 1993).
Wilkes, John, "Predictive Power Conservation," *HPL-CSP-92-5*, Hewlett-Packard Laboratories (Feb. 14, 1992).
Greenawalt, Paul, "Modeling Power Management for Hard Disks," *Technical Report 93–10*, Distributed Computing Research Laboratory, Dept. of Computer Science & Engineering, University of Notre Dame, Notre Dame, Ind. 46566 (Sep. 1993).
"Kittyhawk Power Management Modes," *Kittyhawk Technical Information*, pp. 1–9 (Apr. 1993).
"Leading Capacity, Highest Performance for Notebook & Subnotebook Computers," *Quantum* brochure.

*Primary Examiner*—Gopal C. Ray
*Attorney, Agent, or Firm*—Ratner & Prestia

[57] ABSTRACT

A method for managing the power consumed by a disk drive in a portable laptop computer which includes spinning the disk up during period when the computer apparatus is in an active or idle mode, creating a threshold to determine when to spin down the disk as a function of a period of disk inactivity, spinning the disk down when the threshold is exceeded in order to reduce the power consumption of the disk, automatically increasing the threshold when an undesirable spin up of the disk has occurred and automatically decreasing the threshold when an acceptable spin up of the disk occurs. By virtue of this method, the threshold for disk inactivity is continually monitored and adjusted to maintain a balance between energy consumption and undesirable disk spin down.

8 Claims, 3 Drawing Sheets

U.S. PATENT DOCUMENTS

| | | | |
|---|---|---|---|
| 5,270,992 | 12/1993 | Yasuda et al. | 369/53 |
| 5,283,702 | 2/1994 | Tsuyuguchi et al. | 360/77.04 |
| 5,289,097 | 2/1994 | Erickson et al. | 318/561 |
| 5,345,347 | 9/1994 | Hopkins et al. | 360/71 |
| 5,392,438 | 2/1995 | Gunji | 395/750 |
| 5,396,635 | 3/1995 | Fung | 395/800 |
| 5,412,585 | 5/1995 | Hamilton et al. | 364/569 |
| 5,412,809 | 5/1995 | Tam et al. | 395/750 |
| 5,452,277 | 9/1995 | Bajorek et al. | 369/54 |

ADAPTIVE DISK SPIN-DOWN METHOD FOR MANAGING THE POWER DISTRIBUTED TO A DISK DRIVE IN A LAPTOP COMPUTER

This application is a continuation in part of U.S. application Ser. No. 08/260,104 filed Jun. 15, 1994, entitled "Method For Managing the Power Distributed to a Disk Drive in a Laptop Computer."

BACKGROUND OF THE INVENTION

1. Field of the Invention

The present invention relates to a power distribution scheme in a portable computer and, more specifically to power distributed to a disk drive in a laptop computer.

2. Prior Art

Power consumption in an electronic device is always a significant concern. A power supply must always be designed to adequately power the device, while at the same time take into consideration other related characteristics thereof, such as its heat dissipation, physical size, weight and efficiency. These characteristics are paramount in designing or selecting an appropriate power source and become exceptionally critical when the device the power supply is to support is a self-sufficient portable unit, such as a laptop computer.

In many portable units, a self-supporting power source is used to provide the power when the unit is decoupled from its main or external power source, such as a 110 volt AC current (ordinary house current). Typically, a battery is used to provide this independent and portable power source. In some instances, the battery functions as an auxiliary power source to maintain certain critical circuits active, such as preserving data held in a volatile memory (RAM refreshment). In other instances, the battery functions as the main power source to fully power the device.

In the area of information processing, miniaturization of processing devices has permitted the portability of computing devices. One of the first such portable processing devices developed was a hand-held calculator, wherein the calculator operated from a battery power source and could easily be carried about by the user. The battery would power all of the functions of the calculator, and the user could readily transport the calculator without any attachment to an external power source. The batteries were either replaced or recharged upon being spent. The earliest calculators simply had an on/off state which could be activated on the calculator by a user. Full power was available during the on state, and the power was completely shut off during the off state. Because of the volatile nature of many early semiconductor memories in these calculators, information stored in such volatile memories was lost when the calculator was turned off. Subsequent calculators incorporated non-volatile memory to solve this problem; alternatively, standby power was provided to such a memory when the device was turned off, so that the memory retained whatever information was stored therein. More advanced schemes were devised to monitor various functions, so that power was removed from various elements when those elements were not in use. Further, a time-out scheme was later devised to put the calculator in a standby mode, such as when a key was not depressed after a certain time period, in order to preserve power. All of these features were devised primarily to extend the time period the device could operate from its internal portable power source.

When information processing technology was expanded beyond the simple calculator to encompass personal desk top computers, additional constraints were placed upon power consumption and power management control schemes. Aside from additional circuitry included within these computers that was absent from the aforesaid calculators, additional storage devices in these computers consumed large amounts of power. These memory devices included semiconductor devices, such as read-only memories (ROMs), random access memories (RAMs) (which include volatile and non-volatile memories), floppy disk drives, hard disk drives and other magnetic media. Also, additional power was required to operate the display unit in these computers which typically includes a viewing screen. Various schemes were devised to monitor and control the power distribution to these peripheral devices of a computer during on/off states.

With the advent of the portability of desk top computer systems referred to as laptops, it became desirable to provide them with fully contained, long lasting power sources. Because of their small physical size and light weight, these laptops were designed to operate only for a certain number of hours from their internal power source, i.e., typically a battery. The additional constraints imposed on desk top computers were also placed upon these laptops which contained additional circuitry, memory, viewing screens and peripheral devices attached thereto. These devices necessarily consumed additional power. In order to extend the self-sustaining time period of these laptops while keeping the battery size and weight to a minimum, a sophisticated power management scheme was essential to provide power only to those circuits and devices which required such power and to remove such power, or at least to make a given device enter a low power consumption mode, when that device was inactive. The management scheme also had to continually monitor the various circuits and devices in order that power could be applied immediately to activate such circuits and devices only when needed.

With the increasing popularity of portable laptop computers, and the industry goal to further miniaturize laptop components while enlarging memory size and laptop functions, power management of laptop system components became increasingly more important and a significant problem in the art. Table 1 below gives a listing of major laptop system components and their power consumption in a typical portable computer as measured by those skilled in the art.

TABLE 1

| Component | Manufacturer & Model | Power (watts) | Percent of Total |
|---|---|---|---|
| Display | Compaq monochrome lite25c | 3.5 | 68% |
| Disk Drive (105 Mbytes) | Maxtor MLX-105 III | 1.0 | 20% |
| CPU | 3.3 V Intel486 | 0.6 | 12% |

Breakdown of power consumption by components.

TABLE 1-continued

Breakdown of power consumption by components.

| Component | Manufacturer & Model | Power (watts) | Percent of Total |
|---|---|---|---|
| Memory (16 Mbytes) | Micron MT4CAM4AI/B1 | 0.024 | 0.5% |

At 68%, the display clearly dominates the system power consumption. The disk drive represents 20% of the power consumption in a portable computer. The disk thus became a clear candidate for power management because it is a device, unlike the display, with which the user does not interact directly. With proper management by the operating system, the disk may be spun up when accessed and spun down during long periods of inactivity without the user noticing much difference in performance or reliability of the system.

The recent explosion in the portable computer market enticed disk drive manufacturers to develop a special breed of disk drives especially designed for the portable environment. In addition to high shock tolerances, reduced physical volume and smaller weights, these drives consume less energy and more importantly have a new mode of operation, often called SLEEP mode.

SLEEP mode is when the disk is powered up, but the physical disk platter is not spinning. The SLEEP mode is distinguishable from IDLE mode wherein the disk is spinning but there is an absence of disk activity. ACTIVE mode is different from the SLEEP and IDLE modes in that when the disk platter is spinning, either the disk head is seeking or it is actively reading from or writing onto the disk. OFF mode is when the disk consumes no energy and performs no function except power up. Table 2 shows the power consumed by a typical disk drive as determined by those skilled in the art. Table 3 shows the transition times between disk modes and their power consumptions for a sample disk drive as determined by those skilled in the art.

TABLE 2

Power consumption of the major disk modes for the Maxtor MXL-105 III.

| Mode | Power (watts) |
|---|---|
| OFF | 0.0 |
| SLEEP | 0.025 |
| IDLE | 1.0 |
| ACTIVE | 1.95 |

TABLE 3

Average transition times between major disk modes and their power consumptions for the Maxtor MXL-105 III.

| Transition | Time (seconds) | Power (watts) |
|---|---|---|
| POWERUP | 0.5 | 0.025 |
| SPINUP | 2.0 | 3.0 |
| SEEK | 0.009 | 1.95 |
| SPINDOWN | 1.0 | 0.025 |
| POWERDOWN | 0.5 | N/A |

A very significant portion of the energy consumed by a disk drive is spent in preserving the angular momentum of the physical disk platter. A much smaller fraction is spent in powering the electrical components of the drive. By sleeping, a drive can reduce its energy consumption to near zero by allowing the disk platter to spin down to a resting state. This is aptly called spinning down the disk. This substantial energy reduction, however, is not without its costs. An access to a disk while it is sleeping incurs a delay measured in seconds as opposed to the tens of milliseconds required for an access to a spinning disk. If the disk drive is powered up and used with any frequency (multiple accesses), it will have a significant impact on the length of time the computer can operate on a single battery charge.

There is a large difference in power consumption between a disk that is spinning and one that is not. So systems try to keep the disk spinning only when they must. To get some idea of how the disk can affect battery life, power consumption of a disk on a Dell™ 320 SLi, a Toshiba™ T3300SL and a Zenith™ Mastersport SLe was measured by those skilled in the art. This data is shown in Table 4 below.

TABLE 4

Power measurements of three typical laptop computers.

| Machine | CPU Speed (MHz) | Disk Size (MBytes) | Disk State | System Power (W) | Power Savings (W) | % of Total System Power |
|---|---|---|---|---|---|---|
| Zenith Mastersport SLe | 25.0 | 85 | Idle | 10.5 | 1.0 | 9.5 |
| | | | Stopped | 9.5 | | |
| | 6.5 | | Idle | 9.2 | 0.9 | 9.8 |
| | | | Stopped | 8.3 | | |
| Toshiba T3300SL | 25.0 | 120 | Idle | 8.1 | 1.2 | 14.8 |
| | | | Stopped | 6.9 | | |
| | 6.5 | | Idle | 7.3 | 1.1 | 15.1 |
| | | | Stopped | 6.2 | | |
| Dell 320SLi | 20.0 | 120 | Idle | 4.5 | 0.9 | 20.0 |
| | | | Stopped | 3.6 | | |
| | 2.5 | | Idle | 3.2 | 1.0 | 31.2 |
| | | | Stopped | 2.2 | | |

All three machines were running Mach 3.0 (UX37/MK 77). The machines are listed in the relative order of their age. At the time they were purchased, they represented the state of the art in low power notebook design. All three used the Intel™ SL Superset, which consists of the 386 SL CPU and the 82360 I/O controller. The Zenith™ and Toshiba™ both have a backlit LCD display, while the Dell™ uses a "triple super-twist nematic, reflective LCD" display. The following parameters were varied in these machines: the speed of the CPU, and the state of the disk. These parameters were controlled using hot-key bindings supplied by the system manufacturers. The CPU speed was set at the fastest and slowest speeds available; the disk was set to be either spun up or spun down.

Varying the CPU clock speed was important because the CPU can consume a large amount of power. Reducing its clock speed when there is no work to be done can significantly reduce the amount of power consumed. Mobile computers are likely to be used for highly interactive software (such as mailers, news readers, editors, etc.). So it is reasonable to expect a large amount of CPU idle time. When the CPU clock speed is reduced, a spinning disk will consume proportionally more of the total system power than when clock speed is increased.

Looking at Table 4 above, it is noted that disk densities are increasing, making it possible to carry more data. Machines are now available with even larger disks than the systems noted above. Even though disk densities have increased, the power used by the largest disks has stayed about the same, around 1W for an idle spinning disk. Next, the overall system power cost is dropping. The result is that the amount of power consumed by the disk subsystem on these notebook computers has increased from 9% to 31%. Improved recording densities make it possible to store more data on the same physical device, but they do not affect the physical mass. Drives are becoming more efficient, but cost about the same to spin up and to keep spinning. Theoretically, machines could have smaller disks, but in practice, higher recording densities are used to increase the overall capacity of the storage system instead of decreasing its power consumption. With the exception of the smallest and lightest computers, such as the Hewlett-Packard™ Omnibook, the trend seems to be to carry a larger disk with the same mass rather than a smaller disk with the same number of bytes.

Based on Table 4, proper power management of a disk can not only improve battery life, but can also provide a competitive advantage to one laptop over another. For instance, battery life for the Dell™ 320 could be improved 20 to 31%, the amount that could be saved if the disk were made inactive when not needed. Put another way, a battery that lasts 5 hours could last from 6 to 6.5 hours with proper power management. Of course, turning the disk off can result in increased access latency. After the disk is turned off, additional power will be consumed at start up, i.e. each time the disk is spun up. The system must, therefore, trade off between the power that can be saved by spinning the disk down quickly after each access and the impact on response time (including additional power consumed) from spinning it down and then up again too often.

Current laptop computers implement a number of power reduction techniques to achieve longer battery life. Most, if not all, current mobile computers use a fixed threshold to determine when to spin down the disk: if the disk has been idle for some (predetermined) amount of time, the disk is automatically spun down. The disk is spun up again upon the next access. The fixed threshold is typically on the order of many seconds or minutes to minimize the delay from on demand disk spin ups. The Hewlett-Packard™ Kittyhawk C3014A spins down and up again in about 3 seconds, and its manufacturer recommends spinning it down after about 5 seconds of inactivity; most other disks take several seconds for spin down/spin up and are recommended to spin down only after a period of minutes. In fact, spinning the disk for just a few seconds without accessing it can consume more power than spinning it down and up again upon the next access. Spinning down the disk more aggressively may therefore reduce the power consumption of the disk in exchange for higher latency upon the first access after the disk has been spun down.

In Table 5 below, the last entry, $T_d$ is a break even point where the cost to keep the disk spinning equals the cost in spinning it down immediately and then up again just prior to the next access. In other words, if the next access is likely to be more than $T_d$ seconds in the future, the disk should be spun down and up again prior to the next access, instead of continually spinning the disk, in order to consume less power and preserve battery life. With future knowledge of disk activity, one can spin down the disk immediately if the next access will take place more than $T_d$ seconds in the future. This will result in minimal power consumption and maximum power conservation. There are, of course, complications beyond the simple threshold; for instance, (a) a disk usually has multiple states that consume decreasing amounts of power, but from which it is increasingly costly (in time and power) to return to the active state (for example, when the disk is spinning but the disk head is parked), (b) the time of the next access is usually unpredictable, giving credence to a conservative spin-down approach, and (c) response time (spin up latency) will be adversely affected. Table 5 lists the characteristics of two disk drives for mobile computers, the Hewlett-Packard™ Kittyhawk C3014A and the Quantum™ Go-Drive 120, including values for $T_d$.

TABLE 5

Disk characteristics of the Kittyhawk C3014A and Quantum Go-Drive 120.

| Characteristic | Hewlett-Packard Kittyhawk C3014A | Quantum Go-Drive 120 |
| --- | --- | --- |
| Capacity (Mbytes) | 40 | 120 |
| Power consumed active (W) | 1.5 | 1.7 |
| Power consumed idle (W) | 0.6 | 5.5 |
| Power consumed spin up (W) | 2.2 | 5.5 |
| Normal time to spin up (s) | 1.1 | 2.5 |
| Normal time to spin down (s) | 0.5 | 6.0 |
| Avg time to read 1 Kbyte (ms) | 22.5 | 28.7 |
| Break even interval time $T_d$ (s) | 5.0 | 14.8 |

The time to spin up the disk once a new request arrives has a substantial impact on response time. An on-line approach that spins up the disk when a request arrives if the disk has been spun down will cause the requestor to wait until the disk is ready, typically at least one-two seconds. This latency is up to a couple of orders of magnitude greater than normal disk access times, and should be avoided whenever possible. The high spin up overhead is the reason why typical thresholds for spinning down a disk are often on the order of several minutes, even if $T_d$ is just a few seconds. If the disk has not been accessed for several minutes;, then the overhead of a couple of extra seconds before a new request can be serviced is neither unexpected nor unreasonable.

Industry has taken the approach of a shutdown of system components as a major power management technique. This approach works well when there are clear periods of system inactivity, but fails on the more typical scattered activity patterns. This invention takes into account these scattered activity patterns and provides power conservation in view thereof.

3. Prior Art References

A number of prior art references are known for controlling the consumption of power to a device or to a portion of a device, including a means of providing a time-out when user interaction has not occurred for a given time period. However, these references fail to disclose the sophisticated disk power management scheme for a laptop computer of the present invention. The references are:

Article entitled "Predictive Power Conservation" by Wilkes. This article describes a disk spin down system which sets a threshold time limit for spin down based on past performance (few immediately prior intervals).

U.S. Pat. No. 5,201,059, issued Apr. 6, 1993, for a "Method For Reducing Power Consumption Includes Comparing Variance In Number Of Time Microprocessor Tried To React Input In Predefined Period To Predefined Variance" in which a periodic keyboard polling interrupt is monitored to determine whether a computer is idle and my be powered down.

U.S. Pat. No. 5,197,055, issued Mar. 23, 1993, for an "Idle Demount in an Automated Storage Library" which relates to an automated storage library in which a disk is demounted or spun down on a least-recently-used basis, if the drive has been inactive for a minimum threshold time.

U.S. Pat. No. 4,984,103, issued Jan. 8, 1991, for a "Method for Reading/Writing for a Floppy Disk Drive with Buffer Memory," in which to minimize spin ups of a disk drive, a disk cache stores more information than is requested by a particular access, and then the disk is spun down, not to spin up again until it receives a request for information which is not in the disk buffer.

U.S. Pat. No. 5,157,560, issued Oct. 20, 1992, for "Data Recording and Reproducing Device Designed to Reduce Power Consumption," in which the device conserves power by applying it to only one of the spindle motor and the voice coil motor at any given time.

U.S. Pat. No. 5,167,024, issued Nov. 24, 1992, for "Power Management for a Laptop Computer with Slow and Sleep Modes" in which a laptop computer enters a low power activity in SLEEP mode (the system also has an intermediate power mode in which a slow clock speed is used during periods of inactivity before the fixed time has elapsed).

Specification entitled *Kittyhawk Technical Information,* dated April, 1993, which describes a disk drive which has several power-saving operational modes and which can respond to commands to go from an active mode to a standby mode (electronics are active but disk is spun down) to a sleep mode. A five second threshold is suggested to go from active to standby mode.

Based on the above material, one of the objects of the present invention is to provide a power conservation method for a disk drive in a laptop computer which conserves power while taking into account other related characteristics of the computer device.

Another object of the present invention is to provide an efficient disk power management system for a laptop computer to extend the time the computer can operate on a battery charge by reducing the amount of power used by the disk drive.

A further object of the present invention is to extend the life of a power supply used in a portable computer while keeping the size and weight of such device and power supply to a minimum.

Another object of the present invention is to provide a power supply management scheme which permits monitoring of the threshold used to spin down the disk when said threshold is exceeded.

A still further object of this present invention is to provide an efficient power conservation scheme for a laptop computer which is automatically adaptable to different users and applications.

An object of the present invention is to prevent or minimize a delay in the access time to the disk by a user.

A further object of the present invention is to provide an efficient power conservation scheme for a laptop computer which balances the power that can be saved by spinning a disk down quickly after each access and the impact of spin down on response time when disk access is requested, causing the disk to spin up again.

A still further object of the present invention is to conserve the power in a laptop computer by spinning down the disk immediately when there is inactivity if the next access will likely occur more than $T_d$ seconds in the future, i.e. the next access will likely occur far enough in the future for the system to save power by spinning down the disk.

Another object of the present invention is to take into account the following factors in disk power management: spin up latency (the time it takes a user to access a disk that has already been spun down); and predictability of the next access to the disk (the likelihood of when the next disk request will be made by a user).

SUMMARY OF THE INVENTION

The present invention relates to a power conservation system for a laptop computer. This power system spins down a hard disk drive when it has not been accessed after a predetermined length of time, i.e. a fixed threshold power conservation scheme. The decision to spin down the disk is made by a computer in response to past history of disk activity. The past history of disk activity is also used to continually adjust the threshold. Threshold adjustment occurs when an undesirable spin up occurs (threshold is adjusted upwardly, i.e. threshold increase), when an acceptable spin up occurs (possible threshold adjustment downward, i.e., threshold decrease) or when other information suggests the need to adjust the threshold. In other words, when an undesirable spin up occurs, the threshold should be increased to make future undesirable spin ups less likely; when an acceptable spin up takes place, the threshold should be adjusted gradually ill a downward direction. Undesriable spin-ups are defined with reference to an inconvenience ratio. This ratio is a maximum ratio between the spin-up delay and the idle time prior to a spin-up before that spin-up would be acceptable. In this invention, threshold adjustment occurs upon every spin up event as well as "close calls" (i.e. when the threshold is barely high enough to avoid the disk spinning down and back up again in a short period of time). Threshold adjustment may be additive, subtractive and/or multiplicative and programmed for a fixed number of spin ups or close calls instead of upon every spin up or close call. By stopping the disk from spinning during times when the disk is not needed, based upon past history of disk activity which has resulted in threshold adjustment, battery power or a single battery charge is conserved, and laptop computer operation time is extended.

This power conservation system may be switched in and out by the user via a "power saver" switch. The switch may be implemented either in hardware or software. The user may even override the system when desired (e.g. when system parameters change).

The inventive method includes the steps of spinning the disk up when the computer apparatus is in operation, creating a threshold value to determine when the disk should be spun down during a period of disk inactivity, spinning the disk down when said threshold value is exceeded, spinning the disk up when the next access occurs and adjusting the threshold if the spin up was undesirable or if the spin up was acceptable but could be more acceptable if the adjustment would not increase the number of undesirable spin ups.

Other objects and a fuller understanding of this invention may be had by referring to the following description and claims, taken in conjunction with the accompanying drawings noted below.

DETAILED DESCRIPTION OF THE PRESENT INVENTION

Figure 1:
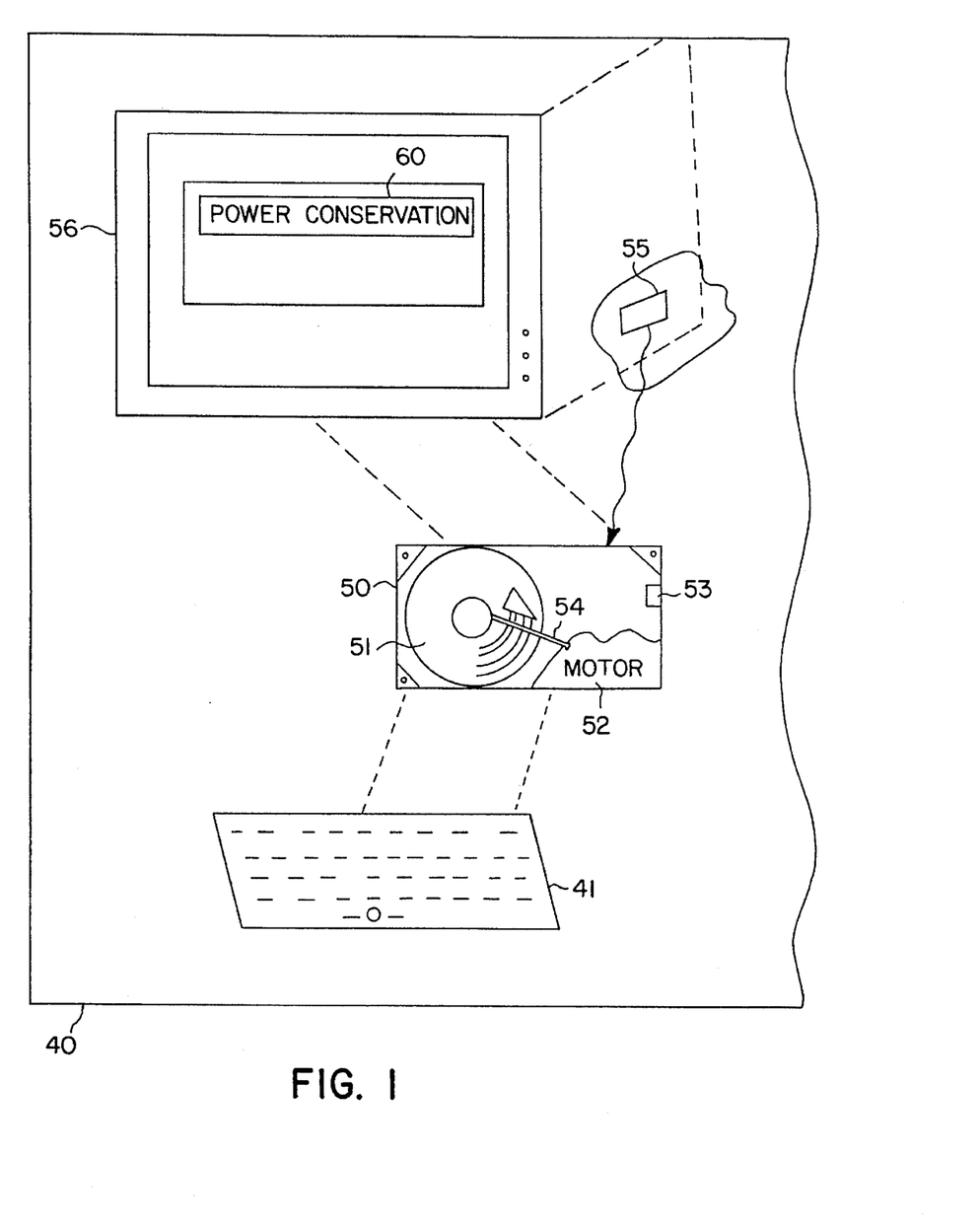
FIG. 1 is a diagram of the system components of a laptop computer with disk drive.

FIG. 1 depicts hardware components used with the subject invention. A laptop computer 40 contains a keyboard 41 for inserting information or commands into the computer. A housing 50 is provided within the computer 40 for housing the disk 51 which is capable of spinning. Connected to the disk 51 is a motor arm 54 for spinning the disk 51. Arm 54 is also connected to a motor 52 which drives the arm 54. Also included within the housing 50 is a power saver switch 53 which may be activated by a user. Switch 53 has an ON and OFF position. The user of the computer need only turn switch 53 to its ON position to activate the power conservation scheme. If switched to it's OFF position, the user is overriding the software driven power conservation scheme.

Figure 2:
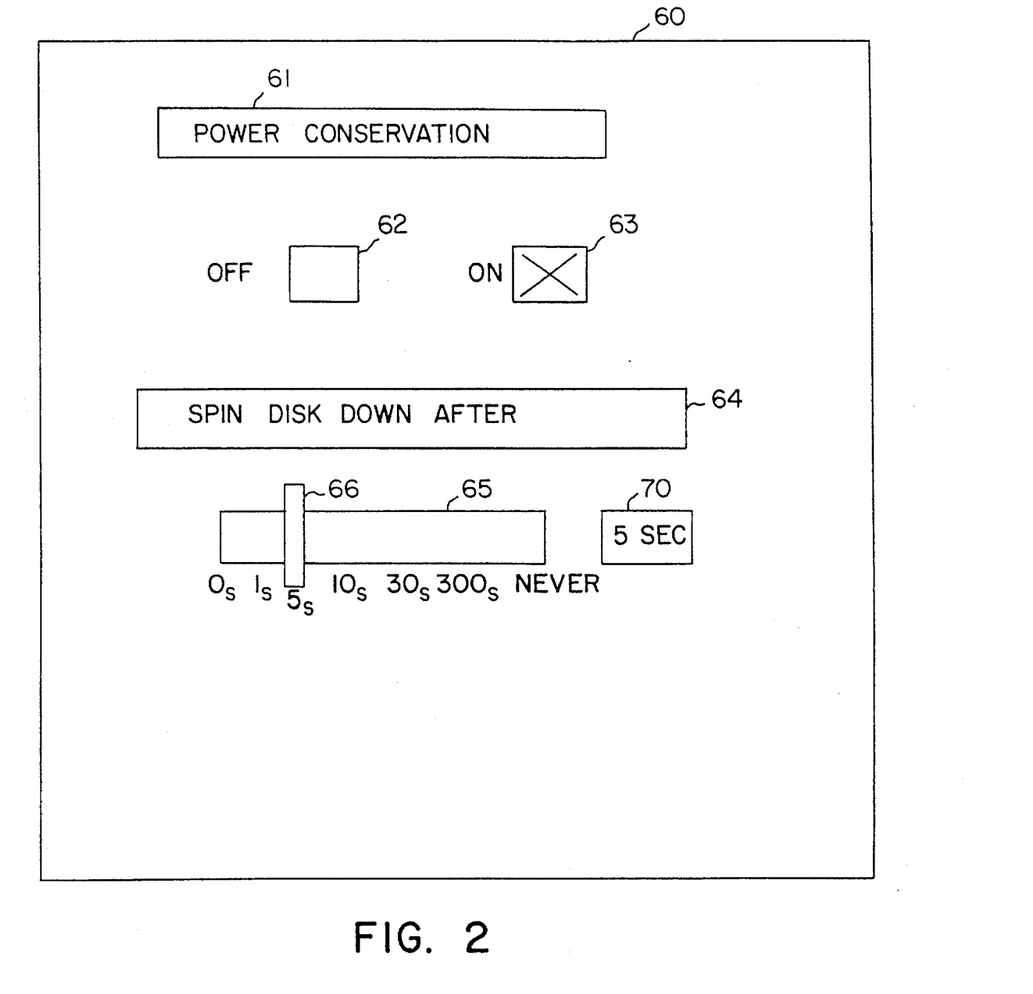
FIG. 2 is a diagram of a laptop computer display of a power conservation menu.

The laptop computer 40 also includes an operating system 55 and a display 56 housing a screen 60. The operating system 55 contains a routine which automatically implements the power conservation scheme of the present invention. The computer user may also implement this power conservation scheme by typing in a command as shown on screen 60 in FIG. 2. On the first line of the screen appears the title of the routine, called Power Conservation, which the user may activate. The user may key in or override the power conservation scheme by activating on line 2 of the screen, box 62, the OFF instruction, or box 63, the ON instruction. In FIG. 2, line 2, box 63, with an "X" contained therein, indicates that the power conservation scheme is being employed by the user. Line 3 of screen 60 indicates that the disk 51 is to be spun down after the number of seconds indicated on the horizontal time scale 65 shown on line 4 of screen 60. A slider arm 66 is movable along scale 65 to identify the temporal period in seconds after which the disk is to be spun down. This temporal period acts as a manual threshold to spin the disk down. Thus, the manual threshold is adjustable depending on the user's needs and desires. A digital representation of this time period is displayed on line 4 of screen 60 at box 67. In FIG. 2, this time period is set at 5 seconds.

In order to activate the power conservation scheme of the present invention, the user must turn switch 53, shown in FIG. 1, to its ON position or key in the ON instruction in box 63 of FIG. 2. It is assumed that the computer has been turned on and is performing operations for the user. Adaptive spin down used ill the power conservation scheme of the present invention monitors the spin down threshold and continually adjusts it to keep a balance between energy consumption and undesirable spin downs. Accordingly, after the disk is spinning and in operation performing user tasks, the first step in the power conservation scheme of the present invention is to create a threshold value of disk inactivity, which when exceeded, determines when the disk should be spun down.

After the threshold value is established, the next step is to permit adjustment of the threshold value. Threshold adjustment is at the heart of adaptive spin down. The adjustment may take place at various times: when an undesirable spin up occurs, when an acceptable spin up occurs, or when other information suggests the need to change the threshold. Undesirable spin-ups are defined with reference to parameters, including an inconvenience ratio, which may be modified by the user and which are described below. For example, an undesirable spin-up may be identified when the amount of time spinning up the disk is greater than the preceeding idle time. When an undesirable spin-up occurs, the threshold is too short and should be increased. When a spin up is acceptable, the threshold may or may not be long enough. It can possibly be decreased without increasing the number of undesirable delays, i.e. delays that severely inconvenience the user. There may be other times when the threshold value should be changed even though no spin up has occurred. For instance, if the disk is idle I seconds and I<T, then the disk should not be spun down. But a slight variation in the arrival time of the next requested access could cause the disk to be spun down, after being idle for more than T seconds, only to be spun up again immediately. Thus, if there is a "close call" (i.e. when next requested access is near threshold), in which the spin down threshold was barely high enough to avoid a situation in which the disk would be spun down and back up again in a short time, it is appropriate to increase the threshold and thus provide a grace period to ensure that it will be unnecessary to spin the disk back up again in such a short time.

There are many possible approaches to, and enhancements of, adaptive spin down. They include the rate at which the threshold is adjusted. The adjustment could occur after every disk spin up or after a fixed number of disk spin ups, thereby using prior history of disk activity vis-a-vis the existing threshold in the decision to adjust the threshold. A formula for adjusting the threshold after the rate has been determined can be arbitrarily complex. One example is to add two different values, $A_a$ and $B_a$ respectively, to T when undesirable or acceptable spin ups occur. One would expect that $A_a>0$, $B_a<0$, and $A_a>|B_a|$. In other words, when an undesirable spin up occurs, the spin down threshold should be increased by enough, i.e. $A_a$, to make future undesirable spin ups significantly less likely; when an acceptable spin up takes place, the spin down threshold should be decreased more gradually, i.e. $B_a$.

Another method is to multiply T by $\alpha_m$ and $\beta_m$ respectively when undesirable or acceptable spin ups occur. Here $\alpha_m>1$ and $0<\beta_m<1$. This method adjusts the threshold value upon every spin up event, as well as after "close calls." This approach can also be modified, for example, to decrease the spin down threshold only when several spin ups in a row are acceptable. There is a difference between decreasing the threshold T by $\beta_a$ after each acceptable spin up and decreasing it by $N\beta_a$ after N acceptable spin ups; if spin ups were independent, with a probability p of being acceptable, the likelihood of N spin ups in a row being acceptable is $p^N$. In practice, spin ups are interdependent, so that mathematical relationship does not hold exactly.

Thus far, the inventive method has assumed that either a spin up is acceptable, or it is not. There is in fact a continuum of degrees of acceptance: spinning up the disk just after it has spun down is worse than spinning it up just before the point at which the delay would be deemed acceptable. In fact, the worst type of spin up is one that occurs before the disk has completely spun down, since the delay in spinning it up will be greater than in normal circumstances when the disk has already been spun down(the disk must typically be fully spun down before the order to spin up can be issued). An improvement on the method above, therefore, is to increment the spin down threshold by a greater amount when the delay due to a spin up is especially egregious than when it is barely above the user's threshold.

Figure 3:
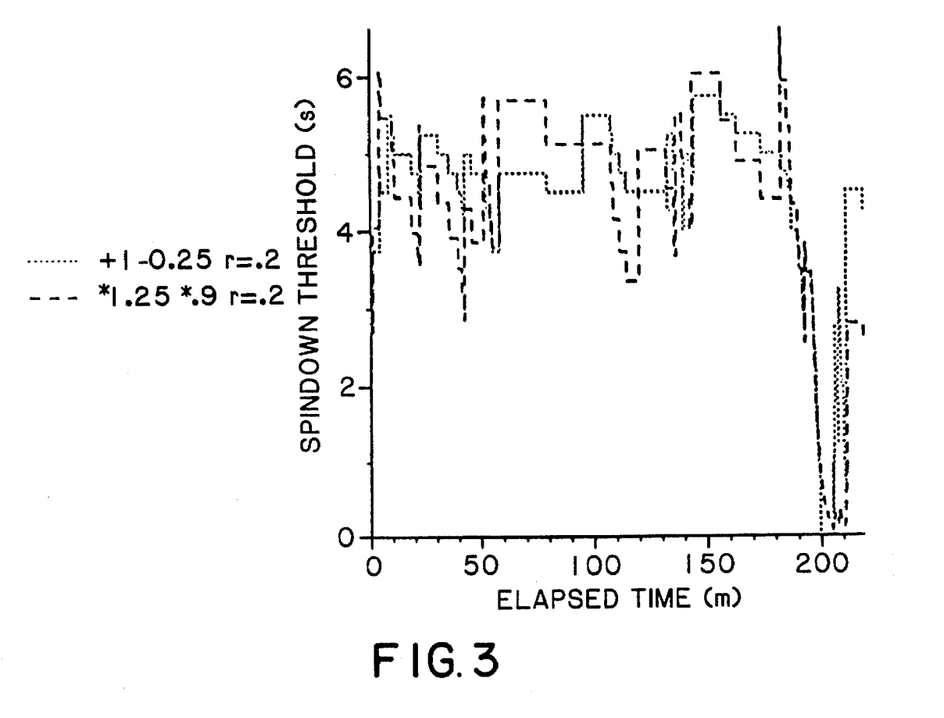
FIG. 3 is a graph illustrating spin down threshold as a function of time.

FIG. 3 illustrates how the spin down threshold can vary over time. It shows both additive and multiplicative modifiers; the multiplicative modifiers have greater effect at high thresholds and lesser effect at low ones. The solid line shows additive modifiers that add a second (1 s) to the threshold upon the occurrence of undesirable spin ups and subtract 250 ms from it upon the occurrence of acceptable ones. The dashed line multiplies the threshold by 1.25 upon undesirable spin ups and by 0.9 upon acceptable ones. In both cases, the inconvenience ratio $\rho$ is 0.2 (the inconvenience ratio is defined in Table 6).

An algorithm for spinning down the disk of a mobile computer using user-specified criteria for the degree of inconvenience of disk spin up consists of the following steps:

1. Initialize the following parameters in Table 6 shown below to the algorithm, using a system default that can be modified under user control. The "possible values" are intended to suggest how the parameters might be set, but are subject to modification based on user performance, experience, hardware configuration and other issues.

3. Spin down the disk anytime it has not been accessed in T seconds.

4. If the disk is accessed while it is spun down, or in the process of spinning down, spin it up immediately and service the request. Call the delay to spin it up $\delta$, and the time since the last access I.

a. If $\delta > \rho I$, the spin up is undesirable. If M=0, set T=min(T+$\alpha$,Tmax), else set T=min(T* $\alpha$,Tmax).
   b. Otherwise, the spin up is acceptable. If M=0, set T=max(T+$\beta$,$T_{min}$), else set T= max(T*$\beta$, $T_{min}$).

An extension of this algorithm is to adjust the threshold after "close calls". One way to do this would be to adjust T as though an undesirable spin up occurred, any time the idle time was within some constant factor $\delta$ of T. Another way would be to use different values to adjust T, depending on whether an actual spin up occurred or whether the disk only came close to spinning down at the wrong time. Another extension is to vary the adjustment based on the severity of the spin up by comparison to idle time.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed:

1. A power conservation method for a computer apparatus that contains a spinnahle disk that exhibits intermittent periods of activity separated by periods of inactivity, the method including the steps of:

spinning the disk up when the computer apparatus is being used;

TABLE 6

Threshold Adjustment Parameters

| Symbol | Parameter Name | Description | Possible Value |
|--------|---------------|-------------|----------------|
| $\rho$ | inconvenience ratio | maximum ratio between the spin up delay and the idle time prior to spin-up, before a spin up is undesirable. | 0.25 |
| M | adjustment method | if M = 0, adjustments are additive, else multiplicative | 0 |
| $\alpha$ | threshold increase adjustment | value that is added to or multiplied by the current spin down threshold after an undesirable spin up | 1000 ms |
| $\beta$ | threshold decrease adjustment | value that is added to or multiplied by the current spin down threshold after an acceptable spin up | −250 ms |
| $T_{init}$ | initial value for spin down threshold | | 10 s |
| $T_{min}$ | minimum spin-down threshold | lowest value the threshold T can attain, even with no undesirable spin-ups | 100 ms |
| $T_{max}$ | maximum spin-down threshold | highest value the threshold T can attain, even with only undesirable spin-ups | dependent on $\rho$ |

2. At any given time, the current spin down threshold is denoted by T. Initialize T=$T_{init}$. Set $$T_{max} = max\left(T_{max}, \frac{\delta max}{\rho}\right),$$

where $\delta_{max}$ is the maximum time the disk can take to spin down and become active again.

creating a first time threshold to determine when to spin down the disk as a function of a period of disk inactivity;

creating a second time threshold to determine when to spin up the disk;

spinning the disk down when said first time threshold is exceeded in order to reduce the power consumption of the disk;

spinning the disk up when requested by a user; and automatically adjusting the first time threshold a) in a first case when spin up of the disk occurs within said second time threshold, said second time threshold beginning with disk spin down and b) in a second case, opposite to the first case, when spin up of the disk occurs following expiration of said second time threshold in order to reduce power consumption of said computer apparatus.

2. The method of claim 1 wherein the adjustment to the first time threshold in the first case is accomplished by adding a value to said first time threshold.

3. The method of claim 1 wherein the step of automatically adjusting the first time threshold includes increasing the first time threshold only when a predetermined number of spin ups occur within said second time threshold.

4. The method of claim 1 wherein the adjustment to the first time threshold in the second case occurs by subtracting a value from said first time threshold.

5. The method of claim 1 wherein the step of automatically adjusting the first time threshold includes decreasing the first time threshold only after a predetermined consecutive nurser of disk spin ups occur outside of said second time threshold.

6. The method of claim 1 wherein the step of adjusting the first time threshold is accomplished by multiplying said first time threshold by a value at every spin up event.

7. The method of claim 1 wherein the step of adjusting the first time threshold is performed after a predetermined number of disk spin ups occurs.

8. The method of claim 1, wherein said second time threshold is based on a ratio of idle time to spin up delay of said disk.

* * * * *

UNITED STATES PATENT AND TRADE MARK OFFICE
CERTIFICATE OF CORRECTION

PATENT NO. : 5,493,670
DATED : Feb. 20, 1996
INVENTOR(S) : Douglis et al.

It is certified that error appears in the above-identified patent and that said Letters Patent is hereby corrected as shown below:

On the title page, Item [54], change "SPN" to --SPIN--.

Column 8, line 44, change "ill" to --in--.

Column 8, line 44, change "Undesriable" to --Undesirable--.

Column 9, line 66, change "ill" to --in--.

Column 11, line 63, change "p" to --ρ--.

Column 12, line 7, change "p" to --ρ--.

Claim 1, Column 12, line 29, change "spinnahle" to --spinnable--.

Claim 1, Column 12, line 65, after "time" delete the ":".

Signed and Sealed this

Fifth Day of November, 1996

Attest:

BRUCE LEHMAN

*Attesting Officer*          *Commissioner of Patents and Trademarks*